US012322288B2

(12) United States Patent
Nilsson et al.

(10) Patent No.: US 12,322,288 B2
(45) Date of Patent: Jun. 3, 2025

(54) VEHICLE CONTROL SYSTEM AND METHOD FOR PROVIDING INFORMATION TO SUPPORT OVERTAKING MANEUVER

(71) Applicants: Ningbo Geely Automobile Research & Development Co., Ltd., Ningbo (CN); Zhejiang Geely Holding Group Co., Ltd., Zhejiang (CN)

(72) Inventors: Magnus Nilsson, Floda (SE); Ronja Rignäs, Bollebygd (SE)

(73) Assignees: Ningbo Geely Automobile Research & Dev. Co., Ltd., Ningbo (CN); ZHEJIANG GEELY HOLDING GROUP CO., LTD., Zhejiang (CN)

( * ) Notice: Subject to any disclaimer, the term of this patent is extended or adjusted under 35 U.S.C. 154(b) by 321 days.

(21) Appl. No.: 18/072,482

(22) Filed: Nov. 30, 2022

(65) Prior Publication Data

US 2023/0091796 A1    Mar. 23, 2023

Related U.S. Application Data

(63) Continuation of application No. PCT/CN2021/093708, filed on May 13, 2021.

(30) Foreign Application Priority Data

Jun. 12, 2020 (EP) .................................... 20179781

(51) Int. Cl.
*G08G 1/09* (2006.01)
*B60W 30/18* (2012.01)
(Continued)

(52) U.S. Cl.
CPC . *G08G 1/096725* (2013.01); *B60W 30/18163* (2013.01); *G06V 20/54* (2022.01);
(Continued)

(58) Field of Classification Search
CPC .......... G08G 1/096725; G08G 1/0137; G08G 1/0175; B60W 30/18163;
(Continued)

(56) References Cited

U.S. PATENT DOCUMENTS 8,810,431 B2    8/2014    Mudalige
9,620,017 B2    4/2017    Trageser
(Continued)

FOREIGN PATENT DOCUMENTS

CN    105216794 A    1/2016
CN    105551282 A    5/2016
(Continued)

OTHER PUBLICATIONS

International Search Report from International Application No. PCT/CN2021/093708, mailed Aug. 12, 2021, 2 pages.
(Continued)

*Primary Examiner* — Adam R Mott
*Assistant Examiner* — Sagar Kc
(74) *Attorney, Agent, or Firm* — Tucker Ellis LLP

(57) ABSTRACT

A vehicle control system for providing information to support an overtaking maneuver by a first vehicle, the vehicle control system includes: a processing circuitry adapted to be operatively connected to a traffic view camera and configured to: receive image data of at least one other vehicle in traffic by the traffic view camera; determine, based on the image data of the at least one other vehicle in traffic, overtaking support data indicative of at least one gap in the traffic suitable for an overtaking maneuver; and provide the overtaking support data to the first vehicle for supporting an overtaking maneuver by the first vehicle.

13 Claims, 6 Drawing Sheets

(51) Int. Cl.
  *G06V 20/54* (2022.01)
  *G06V 20/58* (2022.01)
  *G08G 1/01* (2006.01)
  *G08G 1/017* (2006.01)
  *G08G 1/0967* (2006.01)

(52) U.S. Cl.
  CPC .......... *G06V 20/58* (2022.01); *G08G 1/0137* (2013.01); *G08G 1/0175* (2013.01); *B60W 2420/403* (2013.01); *B60W 2554/4041* (2020.02); *B60W 2554/4042* (2020.02); *B60W 2554/4049* (2020.02); *G06V 2201/08* (2022.01)

(58) Field of Classification Search
  CPC ... B60W 2420/403; B60W 2554/4041; B60W 2554/4042; B60W 2554/4049; B60W 2556/65; B60W 2050/0075; B60W 2556/45; B60W 50/14; G06V 20/54; G06V 20/58; G06V 2201/08; G06V 10/95; G06V 20/56
  See application file for complete search history.

(56) References Cited

U.S. PATENT DOCUMENTS

| | | | | |
|---|---|---|---|---|
| 10,380,897 | B1* | 8/2019 | Patel | G08G 1/162 |
| 2015/0081202 | A1* | 3/2015 | Levin | G08G 1/166 |
| | | | | 701/400 |
| 2015/0367854 | A1* | 12/2015 | Ezoe | B60W 30/18163 |
| | | | | 701/1 |
| 2018/0081371 | A1* | 3/2018 | Bar-Tal | G05D 1/0253 |
| 2018/0290650 | A1* | 10/2018 | Ryne | B60W 10/20 |
| 2019/0217863 | A1* | 7/2019 | Jung | B60W 30/0956 |
| 2019/0329777 | A1 | 10/2019 | Rajab | |
| 2020/0410851 | A1* | 12/2020 | Saito | G08G 1/096741 |
| 2021/0016779 | A1* | 1/2021 | Gillet | B60W 40/04 |

FOREIGN PATENT DOCUMENTS

| | | |
|---|---|---|
| CN | 105644558 A | 6/2016 |
| CN | 108490951 A | 9/2018 |
| CN | 111127903 A | 5/2020 |
| DE | 102018117692 A1 | 1/2020 |
| WO | 2001048724 A1 | 7/2001 |

OTHER PUBLICATIONS

Seong-Woo Kim et al.: "Multivehicle Cooperative Driving Using Cooperative Perception: Design and Experimental Validation", IEEE Transactions on Intelligent Transportation Systems, vol. 16, No. 2; dated Apr. 2015; 18 pages.

Seong-Wood Kim et al.: "The Impact of Cooperative Perception on Decision Making and Planning of Autonomous Vehicles"; IEEE Intelligent Transaction Systems Magazine, dated 2015; 12 pages.

* cited by examiner

VEHICLE CONTROL SYSTEM AND METHOD FOR PROVIDING INFORMATION TO SUPPORT OVERTAKING MANEUVER

RELATED APPLICATION DATA

This application is a continuation of International Patent Application No. PCT/CN2021/093708, filed May 13, 2021, which claims the benefit of European Patent Application No. 20179781.8, filed Jun. 12, 2020, the disclosures of which are incorporated herein by reference in their entireties.

TECHNICAL FIELD

The present disclosure relates to a vehicle control system for providing information to support an overtaking maneuver by a first vehicle.

BACKGROUND

Vehicles in traffic on a road are often driving at different speeds. Sometimes a vehicle is driving slower than the speed limit on the road, e.g. due to other speed limitations or restrictions for that vehicle, or for other reasons. This often results in that other vehicles want to pass the slower driving vehicle. In vehicle traffic on a highway with two or more lanes in the same direction this is often not a problem since one line can be used for overtaking the slower driving vehicle. However, in vehicle traffic on e.g. an expressway with only one lane, and opposite traffic, a vehicle that wants to pass a slower driving vehicle needs to overtake the slower driving vehicle by using the lane for the opposite traffic. In order to pass the slower driving vehicle, a gap in the opposite traffic needs to be found. Sometimes the length of the gap is difficult to predict, and in particular, it can be difficult to predict if the gap is sufficient enough for an overtaking maneuver. For vehicles driven by humans, the determination of the gap can sometimes be stressful and difficult for the driver. In the case of autonomous driving vehicles, the determination of the gap is required in order to perform an overtaking maneuver by the autonomous driving vehicle.

SUMMARY

It is an object of the present disclosure to mitigate, alleviate or eliminate one or more of the above-identified deficiencies and disadvantages in the prior art and solve at least the above mentioned problem. According to a first aspect there is provided a vehicle control system for providing information to support an overtaking maneuver by a first vehicle, the vehicle control system comprises a processing circuitry adapted to be operatively connected to a traffic view camera and configured to receive image data of at least one other vehicle in traffic by the traffic view camera, determine, based on the image data of the at least one other vehicle in traffic, overtaking support data indicative of at least one gap in the traffic suitable for an overtaking maneuver, and provide the overtaking support data to the first vehicle for supporting an overtaking maneuver by the first vehicle.

One advantage with this aspect is that the overtaking support data indicative of at least one gap in the traffic can be determined based on image data from a traffic view camera that is remote from the first vehicle.

According to some embodiments the vehicle control system further comprises a traffic view camera configured to obtain at least one image of at least one vehicle in traffic.

One advantage with this embodiment is that the vehicle control system can obtain at least one image of the at least one vehicle in traffic by at least one traffic view camera, but also advantageously obtain a plurality of images of the at least one vehicle in traffic by a plurality of traffic view cameras at plural different locations.

According to some embodiments, the processing circuitry is further configured to obtain, at least any of a time stamp data, a vehicle position data, and a vehicle speed data associated with a second vehicle, and determine the overtaking support data indicative of the at least one gap based on any of the time stamp data, the vehicle position data, and the vehicle speed data associated with the second vehicle.

Data associated with the second vehicle can hence be used for determining the overtaking support data indicative of the at least one gap.

According to some embodiments, the processing circuitry is further configured to obtain traffic information data by image processing of the image data of the at least one other vehicle in traffic, and provide the traffic information data to the first vehicle.

Traffic information data can hence be provided to the first vehicle based on the content of the image data of the at least one other vehicle in traffic.

According to some embodiments, traffic information data comprises at least any of vehicle image data, vehicle speed data, vehicle position data, vehicle type data, vehicle brand data, vehicle model data, vehicle color data and vehicle license plate data of the at least one other vehicle in traffic.

Traffic information data can hence be used for e.g. identifying the at least one other vehicle in traffic by the driver of the first vehicle, or by a computer in the case the first vehicle is an autonomous driving vehicle.

According to some embodiments, the overtaking support data comprises a determined position and/or a length of the at least one gap.

This means that the overtaking support data e.g. can be used to inform a driver of the first vehicle, or a computer in the case the first vehicle is an autonomous driving vehicle, if the gap has a sufficient length for an overtaking maneuver, and where the gap located is in relation to the first vehicle.

According to some embodiments, the overtaking support data comprises an identification of a vehicle defining the beginning or the end of the at least one gap.

One advantage with this aspect is that a driver of the first vehicle, or a computer in the case the first vehicle is an autonomous driving vehicle, can identify the vehicle defining the beginning or the end of the at least one gap in order to perform the overtaking maneuver in the gap.

According to some embodiments, the traffic view camera is arranged at a second vehicle and configured to obtain image data of the at least one other vehicle in traffic in the opposite direction to the second vehicle, and in accordance with a determination that the second vehicle is in front of the first vehicle travelling in the same direction as the first vehicle, the overtaking support data is indicative of a first gap in the traffic in the opposite direction to the first vehicle ahead of the first vehicle and, in accordance with a determination that the second vehicle is in front of the first vehicle travelling in the opposite direction to the first vehicle, the overtaking support data is indicative of a second gap in the traffic in the same direction as the first vehicle ahead of the first vehicle.

One advantage with this aspect is that with the traffic view camera arranged at a second vehicle, the traffic view camera can obtain image data of the at least one other vehicle in traffic in the opposite direction to the second vehicle, and provide overtaking support data indicative of a first or second gap depending on the direction of travel of the second vehicle in relation to the first vehicle.

According to a second aspect there is provided a method for providing information to support an overtaking maneuver by a first vehicle, the method comprising receiving image data of at least one other vehicle in traffic from a traffic view camera, determining, based on the image data of the at least one other vehicle in traffic, overtaking support data indicative of at least one gap in the traffic suitable for an overtaking maneuver, and providing the overtaking support data to the first vehicle for supporting an overtaking maneuver by the first vehicle.

One advantage with this aspect is that the overtaking support data indicative of at least one gap in the traffic can be determined based on image data from a traffic view camera that is remote from the first vehicle.

According to some embodiments method further comprises obtaining at least any of a time stamp data, a vehicle position data, and a vehicle speed data associated with a second vehicle, and determining the overtaking support data indicative of the at least one gap based on any of the time stamp data, the vehicle position data, and the vehicle speed data associated with the second vehicle.

Data associated with a second vehicle can hence be used for determining the overtaking support data indicative of the at least one gap.

According to some embodiments, the method comprises obtaining traffic information data by image processing of the image data of the at least one vehicle in traffic, and providing the traffic information data to the first vehicle.

Traffic information data can hence be provided to the first vehicle based on the content of the image data of the at least one vehicle in traffic.

According to some embodiments, the traffic information data comprises at least any of vehicle image data, vehicle speed data, vehicle position data, vehicle type data, vehicle brand data, vehicle model data, vehicle color data and vehicle license plate data of the at least one other vehicle in traffic.

Traffic information data can hence be used for e.g. identifying the at least one other vehicle in traffic by the driver of the first vehicle, or by a computer in the case the first vehicle is an autonomous driving vehicle.

According to some embodiments, the overtaking support data comprises an identification of a vehicle defining the beginning or the end of the at least one gap.

One advantage with this aspect is that a driver of the first vehicle, or a computer in the case the first vehicle is an autonomous driving vehicle, can identify the vehicle defining the beginning or the end of the at least one gap in order to perform the overtaking maneuver in the gap.

According to some embodiments, the traffic view camera is arranged at a second vehicle and configured to obtain image data of at least one vehicle in traffic in the opposite direction to the second vehicle, and in accordance with a determination that the first vehicle is in front of the second vehicle travelling in the same direction as the second vehicle, the overtaking support data is indicative of a first gap in the traffic in the opposite direction to the second vehicle ahead of the second vehicle and, in accordance with a determination that the first vehicle is in front of the second vehicle travelling in the opposite direction to the second vehicle, the overtaking support data is indicative of a second gap in the traffic in the same direction as the second vehicle ahead of the second vehicle.

An advantage with this aspect is that with the traffic view camera arranged at a second vehicle, the traffic view camera can obtain image data of the at least one other vehicle in traffic in the opposite direction to the second vehicle, and provide overtaking support data indicative of a first or second gap depending on the direction of travel of the second vehicle in relation to the first vehicle.

According to a third aspect there is provided a processing circuitry program product comprising a non-transitory processing circuitry readable medium, having thereon a processing circuitry program comprising program instructions, the processing circuitry program being loadable into a processing circuitry and configured to cause execution of the method when the processing circuitry program is run by the at least one processing circuitry.

Effects and features of the second and third aspects are to a large extent analogous to those described above in connection with the first aspect. Embodiments mentioned in relation to the first aspect are largely compatible with the second and third aspects.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

DETAILED DESCRIPTION

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

Figure 1A:
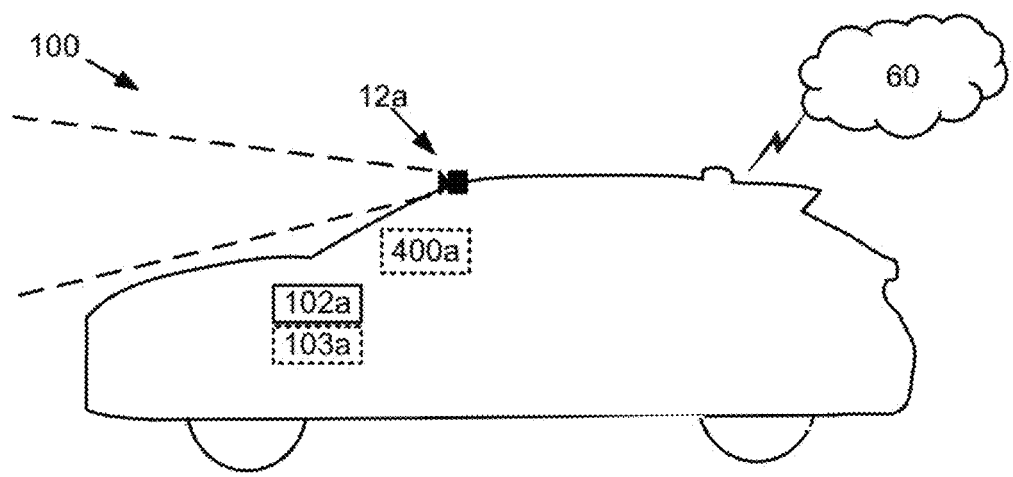
FIG. 1A illustrates a vehicle control system according to an embodiment of the present disclosure.
Figure 1B:
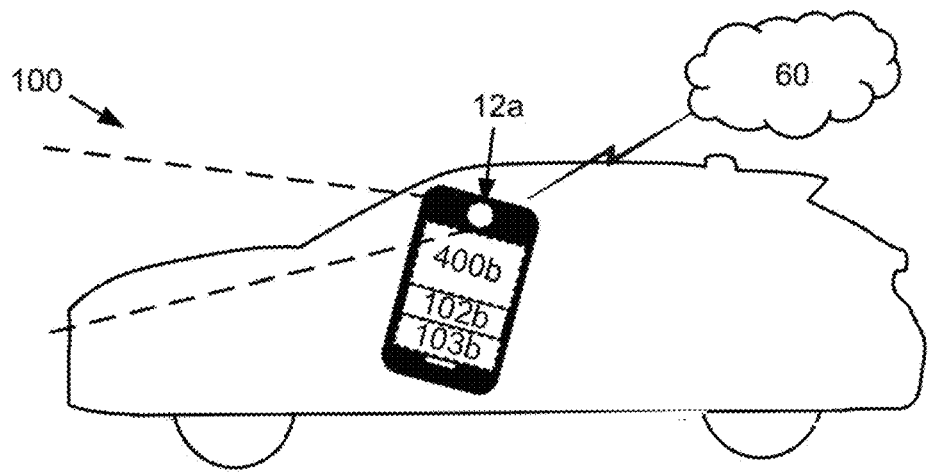
FIG. 1B illustrates a vehicle control system according to an embodiment of the present disclosure.
Figure 2:
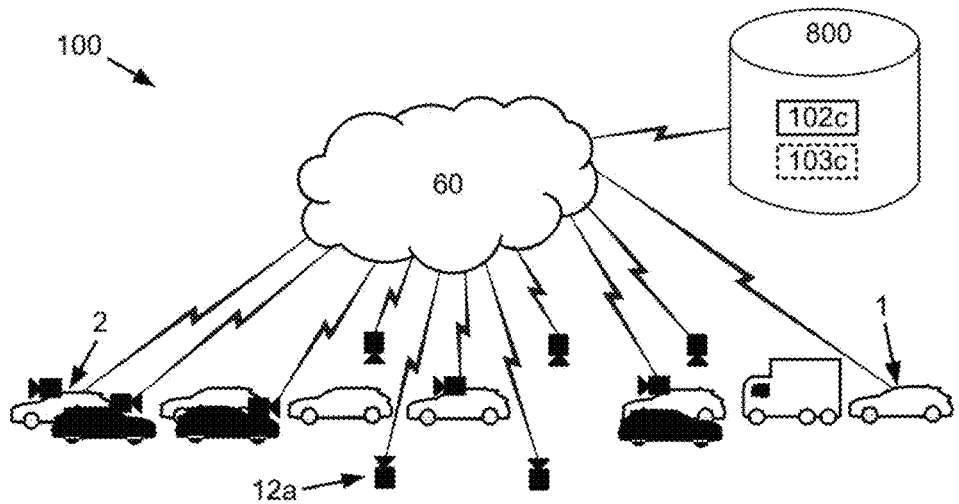
FIG. 2 illustrates a vehicle control system according to an embodiment of the present disclosure.

FIGS. 1A-1B and FIG. 2 each illustrates a vehicle control system 100 according to different embodiments of the present disclosure.

The first aspect of this disclosure shows a vehicle control system 100 for providing information to support an overtaking maneuver by a first vehicle 1. The vehicle control system 100 comprises a processing circuitry 102a, 102b, 102c adapted to be operatively connected to a traffic view camera 12a-12h and configured to receive image data of at least one other vehicle in traffic by the traffic view camera 12a-12h, determine, based on the image data of the at least one other vehicle in traffic, overtaking support data indicative of at least one gap G1, G2 in the traffic suitable for an overtaking maneuver and provide the overtaking support data to the first vehicle 1 for supporting an overtaking maneuver by the first vehicle 1.

One advantage with this aspect is that the overtaking support data indicative of at least one gap G1, G2 in the traffic can be determined based on image data from a traffic view camera 12a-12h that is remote from the first vehicle 1. This means that the overtaking support data indicative of at least one gap G1, G2 can be determined before the gap G1, G2 in the traffic that is suitable for an overtaking maneuver, appears in line of sight for the first vehicle 1.

According to some embodiments the vehicle control system 100 is activated by a determination that the first vehicle 1 is driving slower than the current speed limit, or that the first vehicle 1 is driving slower than a desired speed set by the cruise control of the first vehicle 1, or that the driver of the first vehicle is driving the first vehicle 1 closer than a predetermined distance to the vehicle in front of the first vehicle 1.

According to some embodiments the vehicle control system 100 further comprises a traffic view camera 12a-12h configured to obtain at least one image of at least one vehicle in traffic.

One advantage with this embodiment is that the vehicle control system 100 can obtain at least one image of the at least one vehicle in traffic by at least one traffic view camera 12a-12h, but also, one more advantage is that plural images of the at least one vehicle in traffic can be obtained by plural traffic view cameras 12a-12h at plural different locations. In an example, the at least one other vehicle in traffic is captured by plural traffic view cameras 12a-12h at plural different locations, at different times. According to some embodiments the determination of the overtaking support data indicative of the at least one gap G1, G2 is refined by data associated with the at least one other vehicle in traffic obtained at plural different locations at plural different times by plural different traffic view cameras 12a-12h. In an example, information about a first position and a first speed of the at least one other vehicle in traffic at a first time, in combination with information of a second position and a second speed of the at least one other vehicle in traffic a second time, the determination of the overtaking support data indicative of the at least one gap G1, G2 can be refined and improved for better accuracy.

Figure 3:
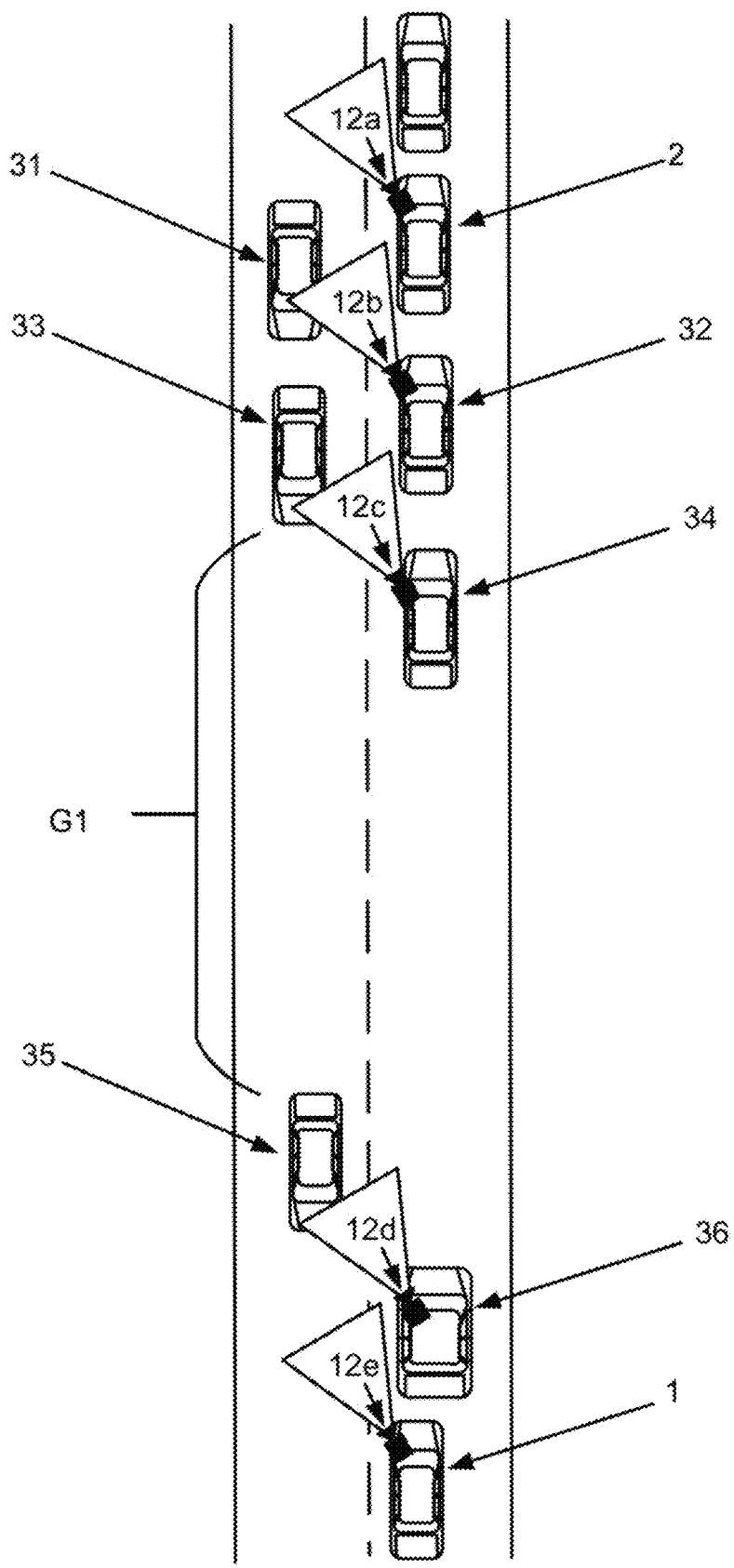
FIG. 3 illustrates an example use case of the vehicle control system according to an embodiment of the present disclosure.
Figure 4:
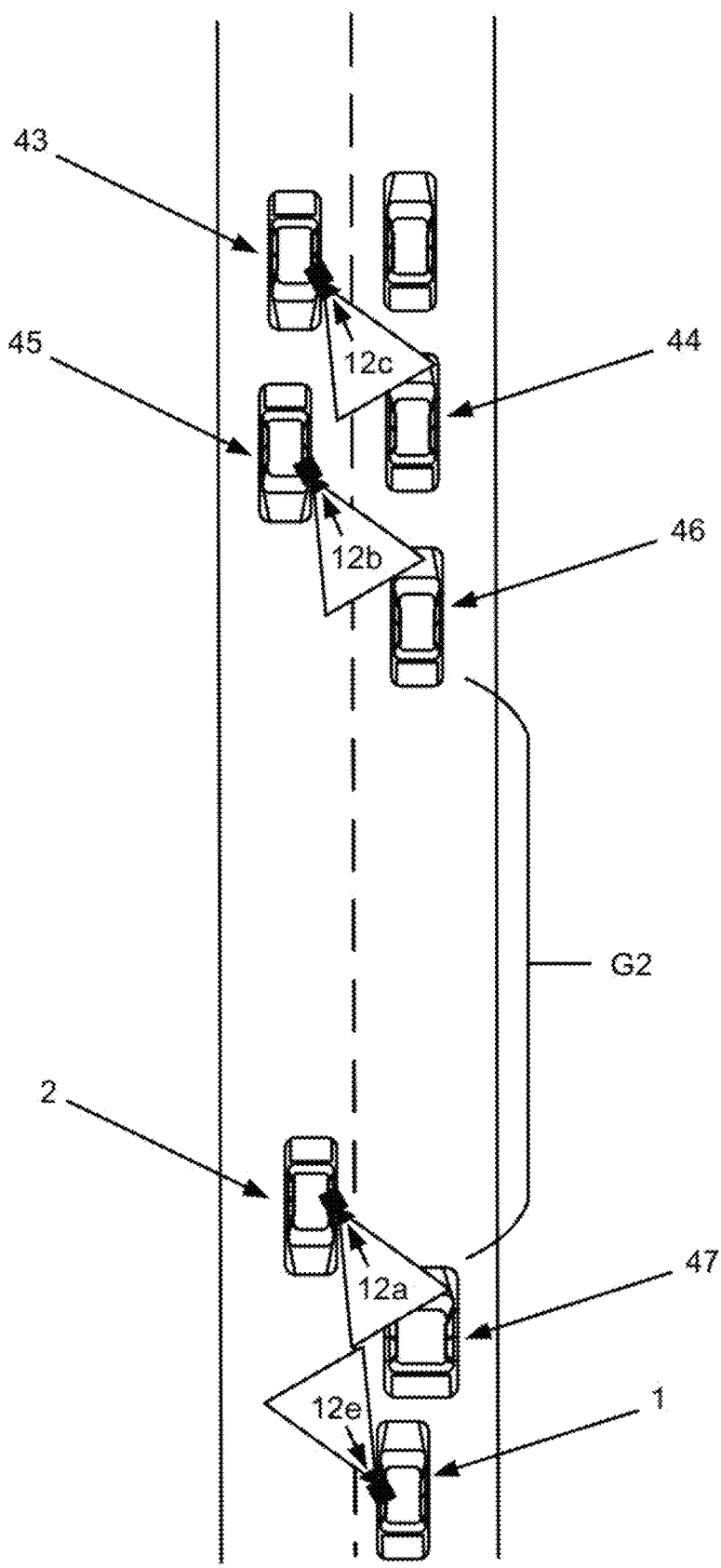
FIG. 4 illustrates an example use case of the vehicle control system according to an embodiment of the present disclosure.
Figure 5:
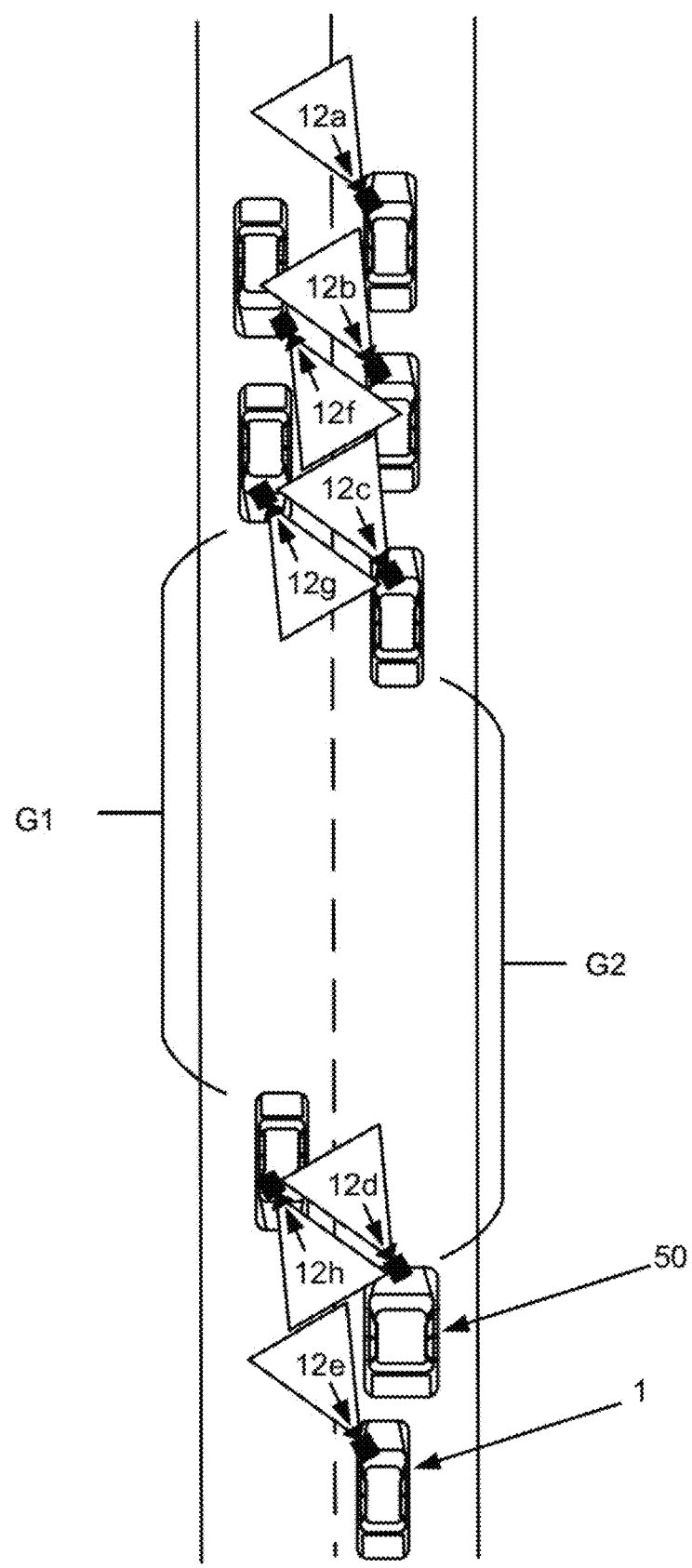
FIG. 5 illustrates an example use case of the vehicle control system according to an embodiment of the present disclosure.

According to some embodiments the vehicle control system 100 comprises a traffic view camera 12a-12h configured to obtain a view of the surroundings outside of a second vehicle 2 to obtain at least one image of at least one vehicle in traffic in the surroundings of the second vehicle 2. According to some embodiments the traffic view camera 12a-12h is arranged at the second vehicle 2. In an example the traffic view camera 12a-12h arranged at the second vehicle 2 is a mobile traffic view camera 12a-12h configured to obtain at least one image of at least one vehicle in traffic at a geographical location that is dependent on where the second vehicle 2 is currently located. In an example the traffic view camera 12a-12h is mounted on the outside or on the inside of the second vehicle 2. According to some embodiments the traffic view camera 12a-12h is integrated into the body of the second vehicle 2. FIGS. 3-5 illustrates embodiments when the traffic view camera 12a is arranged at a second vehicle 2.

According to some embodiments the vehicle control system 100 comprises a traffic view camera 12a-12h configured to obtain a view of a part of a road to obtain at least one image of at least one vehicle in traffic on the road. According to some embodiments the traffic view camera 12a-12h is arranged at the side of the road. In an example the traffic view camera 12a-12h arranged at the side of the road is a stationary traffic view camera 12a-12h configured to obtain at least one image of at least one vehicle in traffic at a certain predetermined geographical location. In an example the traffic view camera 12a-12h is mounted on a road infrastructure object along the road.

Figure 6:
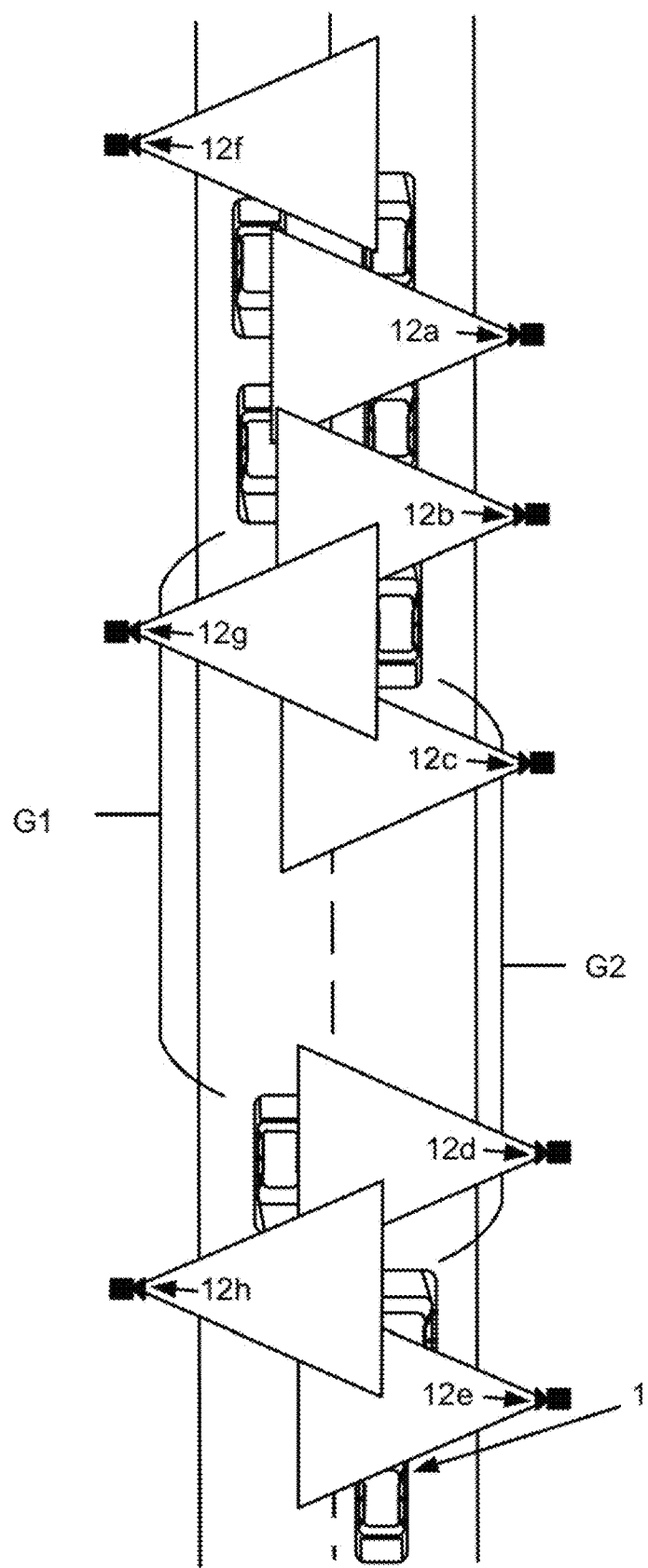
FIG. 6 illustrates an example use case of the vehicle control system according to an embodiment of the present disclosure.

FIG. 6 illustrates an example use case of the vehicle control system 100 with traffic view cameras 12a-h arranged at the side of the road for determining overtaking support data indicative of gaps in the opposite direction G1 to the first vehicle 1 and in the same direction G2 as the first vehicle.

According to some embodiments the view is a wide angle view of the surroundings provided by a wide angle lens of the traffic view camera 12a-12h. According to some embodiments the view is a telephoto view of the surroundings provided by a telephoto lens of the traffic view camera 12a-12h. According to some embodiments the vehicle control system 100 comprises a combination of different traffic view cameras 12a-12h for providing both a wide angle view and a telephoto view of the surroundings. According to some embodiments, a first traffic view camera and a second traffic view camera are configured to obtain a first exterior view and a second exterior view that are overlapping to obtain at least one image of at least one vehicle in traffic.

FIG. 1A illustrates a vehicle control system 100 according to an embodiment of the present disclosure. In FIG. 1A the processing circuitry 102a is a processing circuitry of a vehicle. According to some embodiments the processing circuitry 102a is the processing circuitry of the second vehicle 2. The processing circuitry 102a is operatively connected to a traffic view camera 12a, arranged at the vehicle in the example in FIG. 1A. According to some embodiments a plurality of traffic view cameras 12a-12h are arranged at the same vehicle.

FIG. 1B illustrates a vehicle control system 100 according to an embodiment of the present disclosure. In FIG. 1B the processing circuitry 102b is a processing circuitry of a portable electronic device arranged at the vehicle in FIG. 1B. The processing circuitry 102b is operatively connected to a traffic view camera 12a that is a camera of the portable electronic device as illustrated in FIG. 1B.

According to some embodiments of the vehicle control system 100 as illustrated in FIG. 1A and FIG. 1B, the traffic view camera 12a is configured to obtain image data of at least one other vehicle, to be received by the processing circuitry 102a, 102b to determine overtaking support data indicative of at least one gap G1, G2 in the traffic suitable for an overtaking maneuver.

According to some embodiments of the vehicle control system 100 as illustrated in FIG. 1A and FIG. 1B, the traffic view camera 12a is configured to obtain image data of at least one other vehicle, to be received by a processing circuitry 102c of a remote server 800 to determine overtaking support data indicative of at least one gap G1, G2 in the traffic suitable for an overtaking maneuver.

According to some embodiments, as illustrated in FIG. 2, the traffic view camera 12a is operatively connected to a processing circuitry 102c of a remote server 800 via a communication network 60. In an example the vehicles illustrated in FIG. 1A and FIG. 1B are part of the vehicle control system 100 as illustrated in FIG. 2.

According to some embodiments the image data is obtained by the traffic view camera 12a and provided to the processing circuitry 102c of the remote server 800 via the communication network 60.

According to some embodiments the processing circuitry 102a, 102b, 102c is adapted to be operatively connected to the traffic view camera 12a-12j via the communication network 60.

According to some embodiments the processing circuitry 102c of the remote server 800 determines the overtaking support data indicative of at least one gap G1, G2 in the traffic suitable for an overtaking maneuver.

According to some embodiments the overtaking support data is provided to the first vehicle 1 via the communication network 60. According to some embodiments the image data of at least one other vehicle is received, via the communication network 60, by a processing circuitry 102c of the remote server 800, to determine overtaking support data indicative of at least one gap G1, G2 in the traffic suitable for an overtaking maneuver by the first vehicle 1.

According to some embodiments the image data of at least one other vehicle is received, via the communication network 60, by a processing circuitry at the first vehicle 1, to determine overtaking support data indicative of at least one gap G1, G2 in the traffic suitable for an overtaking maneuver by the first vehicle 1.

FIG. 2 further illustrates a traffic view camera 12a arranged at the side of the road. FIG. 2 further illustrates example traffic view cameras arranged at vehicles and at the side of the road that are operatively connected to the processing circuitry 102a, 102b, 102c via the communication network 60. In the illustration in FIG. 2 example traffic view cameras are operatively connected to a processing circuitry 102c of a remote server 800 via the communication network 60. FIG. 2 further illustrates that the first vehicle 1 is also operatively connected to the remote server 800 via the communication network 60. According to some embodiments the overtaking support data is provided to the first vehicle 1 via the communication network 60.

According to some embodiments the communication network 60 is a wireless communication network. According to some embodiments the wireless communication network is a standardized wireless local area network such as a Wireless Local Area Network, WLAN, Bluetooth™, ZigBee, Ultra-Wideband, UWB, Radio Frequency Identification, RFID, or similar network. According to some embodiments the wireless communication network is a standardized wireless wide area network such as a Global System for Mobile Communications, GSM, Extended GSM, General Packet Radio Service, GPRS, Enhanced Data Rates for GSM Evolution, EDGE, Wideband Code Division Multiple Access, WCDMA, Long Term Evolution, LTE, Narrowband-IoT, 5G, Worldwide Interoperability for Microwave Access, WiMAX or Ultra Mobile Broadband, UMB or similar network. According to some embodiments the wireless communication network can also be a combination of both a wireless local area network and a wireless wide area network. According to some embodiments communication network 60 can be a combination a wired communication network and a wireless communication network. According to some embodiments the communication network 60 is defined by common Internet Protocols.

According to some embodiments the processing circuitry 102a, 102b, 102c is further configured to obtain, at least any of a time stamp data, a vehicle position data, and a vehicle speed data associated with a second vehicle 2, and determine the overtaking support data indicative of the at least one gap G1, G2 based on any of the time stamp data, the vehicle position data, and the vehicle speed data associated with the second vehicle 2.

Data associated with the second vehicle 2 can hence be used for determining the overtaking support data indicative of the at least one gap G1, G2.

According to some embodiments the traffic view camera 12a-12h is arranged at the second vehicle 2 and the image data of the at least one other vehicle in traffic is associated with at least any of a time stamp data, a vehicle position data, and a vehicle speed data of the second vehicle 2.

According to some embodiments any of the time stamp data, the vehicle position data, and the vehicle speed data associated with the second vehicle 2 is obtained by the traffic view camera 12a-12j arranged at the second vehicle 2. According to some embodiments the traffic view camera 12a-12j comprises a position detection unit, e.g. a Global Positioning System receiver, configured to determine the geographical position of the traffic view camera 12a-12j.

According to some embodiments the time stamp data is comprised in the image data obtained by the traffic view camera 12a-12j. According to some embodiments the time stamp data is comprised in the image data as meta data associated with the time when the image of the at least one other vehicle was captured by the traffic view camera 12a-12j arranged at the second vehicle 2. In an example, information that the image of the at least one other vehicle was captured at a certain location at a certain time can be used for determining the overtaking support data indicative of the at least one gap G1, G2.

According to some embodiments the speed of the at least one other vehicle is determined in relation to the speed of the second vehicle 2. According to some embodiments the speed of the at least one other vehicle is determined by image processing of the image data obtained by the traffic view camera 12a-12h arranged at the second vehicle 2. According to some embodiments the speed of the at least one other vehicle is determined by a speed determining device arranged at the second vehicle 2 and operatively connected to the processing circuitry 102a, 102b, 102c. According to some embodiments the speed determining device is any of a Radar or Lidar device configured to measure the distance from the second vehicle 2 to the at least one other vehicle and/or the speed of the at least one other vehicle.

According to some embodiments, with reference to FIG. 1A, the traffic view camera 12a is arranged at a second vehicle 2 and any of the time stamp data, the vehicle position data, and the vehicle speed data associated with the second vehicle 2 is obtained by a position detection unit, a speed detection unit and the processing circuitry 102a of the second vehicle 2.

According to some embodiments, with reference to FIG. 1B, the traffic view camera 12a is a camera of a portable electronic device arranged at a second vehicle 2 and the time stamp data, the vehicle position data, and the vehicle speed data associated with the second vehicle 2 is obtained by the portable electronic device.

FIG. 3 illustrates an example use case of the vehicle control system 100 determining overtaking support data indicative of a gap G1 in the traffic in the opposite direction to the first vehicle 1. In the example as illustrated in FIG. 3, a traffic view camera 12a is arranged at a second vehicle 2 that is in front of a first vehicle 1. In the example the traffic view camera 12a, arranged at the second vehicle 2, captures images of at least one other vehicle in the opposite direction that the vehicle 2 meets. In the example time stamp data and vehicle position data associated with the second vehicle 2 is obtained each time the traffic view camera 12a captures an image of at least one other vehicle. In the example illustration of FIG. 3, a first other vehicle 35 was captured at a first time at a first location by the traffic view camera 12a, arranged at the second vehicle 2. Further, in the example illustration of FIG. 3, a second other vehicle 33 was captured at a second time at a second location and a third other vehicle 31 was captured at a third time at a third location. In the example the time between the first other vehicle 35 and the second other vehicle 33 is determined to be sufficiently long for a gap G1 in the traffic suitable for an overtaking maneuver and e.g. the time stamp data associated with the second vehicle 2 can hence be used to determine the overtaking support data indicative of the gap G1. The different locations can be used to predict where and when the gap G1 in the traffic suitable for an overtaking maneuver will appear for the first vehicle 1.

In the example as illustrated in FIG. 3, traffic view cameras 12b-d are also arranged at the vehicles 32, 34 and 36 that are going in the same direction as the second vehicle 2. Time stamp data, vehicle position data, and vehicle speed data associated with images of the at least one other vehicle 35, 33 and 31 captured by traffic view cameras 12b-d arranged at each of the vehicles 32, 34 and 36, can hence be used in a similar way as described previously to determine and refine the overtaking support data indicative of the gap G1.

FIG. 4 illustrates an example use case of the vehicle control system determining overtaking support data indicative of a gap G2 in the traffic in the same direction as the first vehicle 1. In the example as illustrated in FIG. 4, a traffic view camera 12a is arranged at a second vehicle 2 that is in the opposite direction to a first vehicle 1. In the example the traffic view camera 12a, arranged at the second vehicle 2, captures images of at least one other vehicle in the opposite direction that the vehicle 2 meets. In the example time stamp data and vehicle position data associated with the second vehicle 2 is obtained each time the traffic view camera 12a captures an image of at least one other vehicle. In the example illustration of FIG. 4, a first other vehicle 44 was captured at a first time at a first location by the traffic view camera 12a, arranged at the second vehicle 2. Further, in the example illustration of FIG. 4, a second other vehicle 46 was captured at a second time at a second location and a third other vehicle 47 was captured at a third time at a third location. In the example the time between the second other vehicle 46 and the third other vehicle 47 is determined to be sufficiently long for a gap G2 in the traffic suitable for an overtaking maneuver, where the gap G2 is suitable for merging the first vehicle 1 back into the lane after the overtaking maneuver. The time stamp data associated with the second vehicle 2 can hence be used to determine the overtaking support data indicative of the at least one gap for merging the first vehicle back into the lane after the overtaking maneuver. The different locations can be used to predict where and when the gap G2 in the traffic suitable for an overtaking maneuver will appear for the first vehicle 1.

In the example as illustrated in FIG. 4, traffic view cameras 12b-12c are also arranged at the vehicles 45 and 43 that are going in the same direction as the second vehicle 2. Time stamp data, vehicle position data, and vehicle speed data associated with images of the at least one other vehicle 45 and 43 captured by traffic view cameras 12b-12c arranged at each of the vehicles 45 and 43, can hence be used in a similar way as described previously to determine and refine the overtaking support data indicative of the gap G2.

FIG. 5 illustrates plural traffic view cameras 12a-12h arranged at plural vehicles. According to some embodiments image data of the at least one other vehicle in traffic is obtained by different traffic view cameras 12a-12h arranged at different vehicles in traffic and received by the processing circuitry 102a, 102b, 102c for determining overtaking support data indicative of at least one gap G1, G2 in the traffic suitable for an overtaking maneuver.

In the example as illustrated in FIG. 5 the at least one gap G1, G2 can be a gap in the traffic suitable for an overtaking maneuver where a first gap G1 is used for the overtaking of a vehicle in traffic by the first vehicle 1, and where a second gap G2 is used for merging of the first vehicle 1 into the same lane again after returning from the overtaking of the vehicle in traffic. In the example as illustrated in FIG. 5 the first gap G1 is used when overtaking the vehicle 50 and the second gap G2 is used for merging the first vehicle 1 back into the same lane again after the overtaking. According to some embodiments the at least one gap G1, G2 in the traffic suitable for an overtaking maneuver is a gap in the traffic in the line for traffic in the opposite direction to the direction of travel of the first vehicle 1. According to some embodiments the at least one gap G1, G2 in the traffic suitable for an overtaking maneuver is a gap in the traffic in the same line for traffic in the same direction of travel as the first vehicle 1.

According to some embodiments image data of the at least one other vehicle in traffic captured by plural traffic view cameras 12a-12h are associated and stored in a memory 103a, 103b, 103 c.

According to some embodiments the memory 103a, 103b, 103 c is operatively connected to the processing circuitry 102a, 102b, 102c. In an example the memory 103a, 103b, 103 c is operatively connected to the processing circuitry 102a, 102b, 102c via the communication network 60.

According to some embodiments image data of the at least one other vehicle in traffic captured by plural traffic view cameras 12a-12h are associated with each other and stored in a memory 103a, 103b, 103c together with at least any of a time stamp data, a vehicle position data, and a vehicle speed data associated with at least a second vehicle 2. Plural vehicles can hence be equipped with traffic view cameras 12a-12h and support the determination of overtaking support data indicative of at least one gap G1, G2 in the traffic suitable for an overtaking maneuver.

According to some embodiments the overtaking support data is set to only be valid if the overtaking support data is not older than a predetermined time period. According to some embodiments the overtaking support data is set to only be valid if the overtaking support data is generated based on image data captured by a traffic view camera 12a-12h that is within a predetermined distance from the location of the first vehicle 1. According to some embodiments the overtaking support data is set to only be valid if the overtaking support data is determined based on image data of the at least one other vehicle obtained by a predefined number of traffic view camera 12a-12h at different locations. In one example the overtaking support data needs to be verified by a determination of overtaking support data by a further processing circuitry.

According to some embodiments the determination of the overtaking support data is further dependent on a probability factor. According to some embodiments the overtaking support data is not considered reliable when the probability factor is below a predetermined threshold value. According to some embodiments the probability factor is determined based on at least one obtained environmental factor. According to some embodiments the environmental factor is dependent on any of weather information, speed limit information, local traffic rules information, traffic congestion information, location dependent information and vehicle-to-vehicle communication information. In an example the overtaking support data is not considered reliable in a determination that the outside temperature is below freezing. In an example the overtaking support data is not considered reliable in a determination that the first vehicle 1 is in the vicinity of a school. In an example the overtaking support data is not considered reliable in a determination that the first vehicle 1 is in the vicinity of a road work.

According to some embodiments the overtaking support data is adapted to be displayed via a user interface 400a, 400b to a driver of the first vehicle 1 for visualizing the gap G1, G2 in the traffic suitable for an overtaking maneuver. In an example the gap G1, G2 is visualized on a map of a display in the first vehicle 1.

According to some embodiments the first vehicle 1 is an autonomous driving vehicle. According to some embodiments the overtaking support data is adapted to be received at a processing circuitry at an autonomous driving vehicle for controlling autonomous driving in the gap G1, G2 in the traffic suitable for an overtaking maneuver.

According to some embodiments the processing circuitry 102a, 102b, 102c is further configured to obtain traffic information data by image processing of the image data of the at least one other vehicle in traffic, and provide the traffic information data to the first vehicle 1.

Traffic information data can hence be provided to the first vehicle 1 based on the content of the image data of the at least one other vehicle in traffic.

According to some embodiments the image processing of the image data is performed continuously by the processing circuitry 102a, 102b, 102c to identify traffic information data associated with the at least one other vehicle in traffic.

According to some embodiments the traffic information data comprises at least any of vehicle image data, vehicle speed data, vehicle position data, vehicle type data, vehicle brand data, vehicle model data, vehicle color data and vehicle license plate data of the at least one other vehicle in traffic.

Traffic information data can hence be used for e.g. identifying the at least one other vehicle in traffic by the driver of the first vehicle 1, or by a computer in the case the first vehicle 1 is an autonomous driving vehicle.

According to some embodiments the traffic information data is used for identifying the at least one other vehicle in traffic during image processing of the image data obtained by a camera of the first vehicle 1. According to some embodiments the camera of the first vehicle 1 is a traffic view camera. In an example traffic information data such as the vehicle license plate data of the at least one other vehicle in traffic can hence be used during image processing of the image data obtained by a camera of the first vehicle 1 for identifying when the at least one other vehicle in traffic is in the line of sight of the first vehicle 1.

According to some embodiments the overtaking support data comprises a determined position and/or a length of the at least one gap G1, G2.

This means that the overtaking support data can e.g. be used to inform a driver of the first vehicle, or a computer in the case the first vehicle is an autonomous driving vehicle, if the gap has a sufficient length for an overtaking maneuver, and where the gap located is in relation to the first vehicle.

According to some embodiments the overtaking support data comprising dynamic location information data indicative of the at least one gap G1, G2 in the traffic suitable for an overtaking maneuver that is dependent on the speed of the first vehicle 1. According to some embodiments the overtaking support data is adapted to be displayed via a user interface 400a, 400b to a driver of the first vehicle 1 for visualizing a movement of the gap G1, G2 on a map dependent on the current speed and location of the first vehicle 1.

According to some embodiments the dynamic location information data indicative of the at least one gap G1, G2 is dependent on a determined speed of the at least one other vehicle in traffic and a determined speed of the first vehicle 1. According to some embodiments the dynamic location information data indicative of the at least one gap G1, G2 is dependent on a determined location of the at least one other vehicle in traffic, the current speed limit in the direction of the at least one other vehicle in traffic, and a determined speed of the first vehicle 1.

According to some embodiments the overtaking support data comprises an identification of a vehicle defining the beginning or the end of the at least one gap G1, G2.

One advantage with this aspect is that a driver of the first vehicle, or a computer in the case the first vehicle is an autonomous driving vehicle, can identify the vehicle defining the beginning or the end of the at least one gap in order to perform the overtaking maneuver in the gap.

In an example, illustrated in FIG. 3, overtaking support data indicative of the gap G1 is provided to the first vehicle 1. In addition to the overtaking support, traffic information data is also provided to the first vehicle 1. In the example as illustrated in FIG. 3 traffic information data of the at least one other vehicle 35 has been obtained by image processing of the image data obtained by the traffic view cameras 12a-12d. In the example the traffic information data is indicative of a yellow vehicle with the vehicle license plate data "ABC 12A". The overtaking support data indicative of the gap G1 is then provided to the first vehicle 1 indicative of that the at least one other vehicle 35, that is a yellow vehicle with vehicle license plate data "ABC 12A", is the last vehicle in traffic before the gap G1. With an identification of the vehicle defining the beginning of the gap G1, the driver of the first vehicle 1 can hence get ready for an overtaking maneuver when the at least one other vehicle 35 has passed.

According to some embodiments the traffic information data, obtained by image processing of the image data of the at least one vehicle in traffic, is used for defining the beginning or the end of the at least one gap G1, G2.

According to some embodiments the vehicle license plate data is used for requesting further information about the at least one vehicle in traffic to provide further information about the at least one vehicle in traffic. In an example the traffic information data is indicative of vehicle license plate data "ABC 12A". In the example the vehicle license plate data "ABC 12A" is used for requesting further information about the at least one vehicle in traffic. According to some embodiments vehicle specification data based on traffic information data is received by the vehicle control system 100 and provided to the first vehicle 1. In the example information about the vehicle type, brand, model, color, manufacturing year is obtained based on the vehicle license plate data "ABC 12A" and obtained to the first vehicle 1.

According to some embodiments a computer generated image of the vehicle defining the beginning or the end of the at least one gap G1, G2 is displayed via the user interface 400a, 400b to the driver of the first vehicle, and the driver of the first vehicle 1 can hence get ready for an overtaking maneuver when the vehicle defining the beginning or the end of the at least one gap G1, G2 has passed.

According to some embodiments the traffic view camera 12a-12h is arranged at a second vehicle 2 and configured to obtain image data of the at least one other vehicle in traffic in the opposite direction to the second vehicle 2, and in accordance with a determination that the second vehicle 2 is in front of the first vehicle 1 travelling in the same direction as the first vehicle 1, the overtaking support data is indicative of a first gap G1 in the traffic in the opposite direction to the first vehicle 1 ahead of the first vehicle 1 and, in accordance with a determination that the second vehicle 2 is in front of the first vehicle 1 travelling in the opposite direction to the first vehicle 1, the overtaking support data is indicative of a second gap G2 in the traffic in the same direction as the first vehicle 1 ahead of the first vehicle 1.

One advantage with this aspect is that with the traffic view camera 12a-12h arranged at a second vehicle 2, the traffic view camera 12a-12h can obtain image data of the at least one other vehicle in traffic in the opposite direction to the second vehicle 2, and provide overtaking support data indicative of a first or second gap depending on the direction of travel of the second vehicle 2 in relation to the first vehicle 1.

According to some embodiments the direction of driving and the location of the first and second vehicle 1, 2 is determined. According to some embodiments it is further determined if the first and second vehicle 1, 2 are driving on the same road and/or if the first and second vehicle 1, 2 are driving on separate roadways that are separated from each other. In a determination that the first and second vehicle 1, 2 are no longer driving on the same road the overtaking support data is not considered valid.

Figure 7:
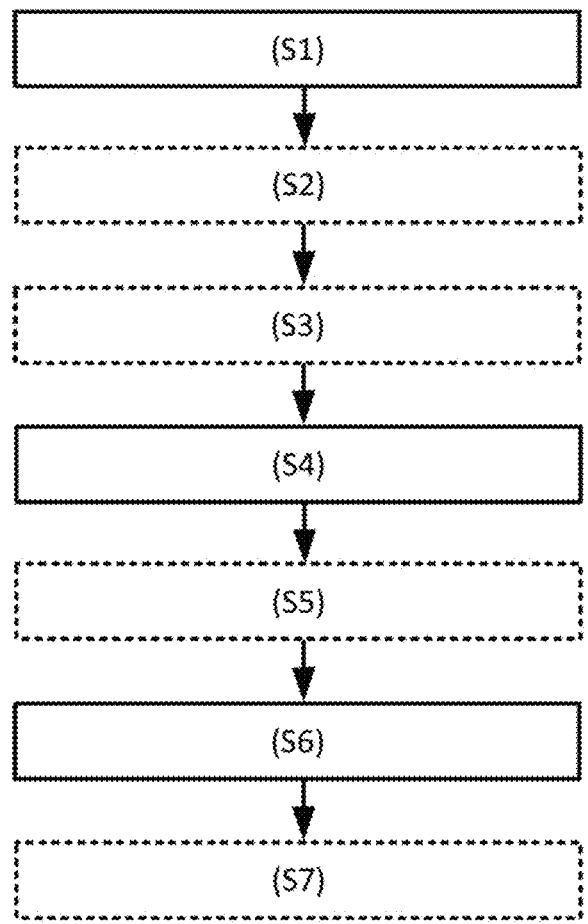
FIG. 7 illustrates a flow chart of the method steps according to the second aspect of the disclosure.

The second aspect of this disclosure, as illustrated in FIG. 7, shows a method for providing information to support an overtaking maneuver by a first vehicle 1. The method comprising the step of S1 receiving image data of at least one other vehicle in traffic from a traffic view camera 12a-12h. The method further comprising the step of S4 determining, based on the image data of the at least one other vehicle in traffic, overtaking support data indicative of at least one gap G1, G2 in the traffic suitable for an overtaking maneuver, and the step of S6 providing the overtaking support data to the first vehicle 1 for supporting an overtaking maneuver by the first vehicle 1.

One advantage with this aspect is that the overtaking support data indicative of at least one gap in the traffic can be determined based on image data from a traffic view camera that is remote from the first vehicle.

According to some embodiments the method further comprises the step of S3 obtaining at least any of a time stamp data, a vehicle position data, and a vehicle speed data associated with a second vehicle 2, and the step of S5 determining the overtaking support data indicative of the at least one gap G1, G2 based on any of the time stamp data, the vehicle position data, and the vehicle speed data associated with the second vehicle 2.

Data associated with a second vehicle can hence be used for determining the overtaking support data indicative of the at least one gap.

According to some embodiments the method further comprises the step of S2 obtaining traffic information data by image processing of the image data of the at least one vehicle in traffic, and the step of S7 providing the traffic information data to the first vehicle 1.

Traffic information data can hence be provided to the first vehicle based on the content of the image data of the at least one vehicle in traffic.

According to some embodiments the traffic information data comprises at least any of vehicle image data, vehicle speed data, vehicle position data, vehicle type data, vehicle brand data, vehicle model data, vehicle color data and vehicle license plate data of the at least one other vehicle in traffic.

Traffic information data can hence be used for e.g. identifying the at least one other vehicle in traffic by the driver of the first vehicle, or by a computer in the case the first vehicle is an autonomous driving vehicle.

According to some embodiments the overtaking support data comprises an identification of a vehicle defining the beginning or the end of the at least one gap G1, G2.

One advantage with this aspect is that a driver of the first vehicle, or a computer in the case the first vehicle is an autonomous driving vehicle, can identify the vehicle defining the beginning or the end of the at least one gap in order to perform the overtaking maneuver in the gap.

According to some embodiments the traffic view camera 12a-12h is arranged at a second vehicle 2 and configured to obtain image data of at least one vehicle in traffic in the opposite direction to the second vehicle 2, and in accordance with a determination that the first vehicle 1 is in front of the second vehicle 2 travelling in the same direction as the second vehicle 2, the overtaking support data is indicative of a first gap G1 in the traffic in the opposite direction to the second vehicle 2 ahead of the second vehicle 2 and, in accordance with a determination that the first vehicle 1 is in front of the second vehicle 2 travelling in the opposite direction to the second vehicle 2, the overtaking support data is indicative of a second gap G2 in the traffic in the same direction as the second vehicle 2 ahead of the second vehicle 2.

An advantage with this aspect is that with the traffic view camera arranged at a second vehicle, the traffic view camera can obtain image data of the at least one other vehicle in traffic in the opposite direction to the second vehicle, and provide overtaking support data indicative of a first or second gap depending on the direction of travel of the second vehicle in relation to the first vehicle.

Figure 8:
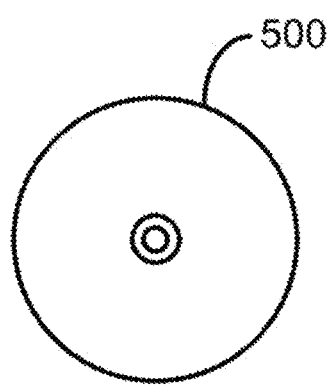
FIG. 8 illustrates a processing circuitry program product according to the third aspect of the disclosure.

The third aspect of this disclosure, as illustrated in FIG. 8, shows a processing circuitry program product the second aspect comprising a non-transitory processing circuitry readable medium, having thereon a processing circuitry program comprising program instructions, the processing circuitry program being loadable into a processing circuitry 102a, 102b, 102c and configured to cause execution of the method when the processing circuitry program is run by the at least one processing circuitry 102a, 102b, 102c.

The person skilled in the art realizes that the present disclosure is not limited to the preferred embodiments described above. The person skilled in the art further realizes that modifications and variations are possible within the scope of the appended claims. Additionally, variations to the disclosed embodiments can be understood and effected by the skilled person in practicing the claims, and from a study of the drawings, the disclosure, and the appended claims.

What is claimed is:

1. A vehicle control system for providing information to support an overtaking maneuver by a first vehicle, the vehicle control system comprises:
    a processing circuitry adapted to be operatively connected to a traffic view camera and configured to:
    receive image data of at least one other vehicle in traffic by the traffic view camera;
    determine, based on the image data of the at least one other vehicle in traffic, overtaking support data indicative of at least one gap in the traffic suitable for the overtaking maneuver; and
    provide the overtaking support data to the first vehicle for supporting the overtaking maneuver by the first vehicle;
    wherein the traffic view camera is arranged at a second vehicle and configured to obtain image data of the at least one other vehicle in traffic in the opposite direction to the second vehicle, and
    in accordance with a determination that the second vehicle is in front of the first vehicle travelling in the same direction as the first vehicle, the overtaking support data is indicative of a first gap in the traffic in the opposite direction to the first vehicle ahead of the first vehicle; and
    in accordance with a determination that the second vehicle is in front of the first vehicle travelling in the opposite direction to the first vehicle, the overtaking support data is indicative of a second gap in the traffic in the same direction as the first vehicle ahead of the first vehicle.

2. The vehicle control system according to claim 1 wherein the vehicle control system further comprises:
    a traffic view camera configured to obtain at least one image of at least one vehicle in traffic.

3. The vehicle control system according to claim 1, wherein the processing circuitry is further configured to:
    obtain, at least any of a time stamp data, a vehicle position data, and a vehicle speed data associated with a second vehicle; and
    determine the overtaking support data indicative of the at least one gap based on any of the time stamp data, the vehicle position data, and the vehicle speed data associated with the second vehicle.

4. The vehicle control system according to claim 1, wherein the processing circuitry is further configured to:
    obtain traffic information data by image processing of the image data of the at least one other vehicle in traffic; and
    provide the traffic information data to the first vehicle.

5. The vehicle control system according to claim 4, wherein traffic information data comprises at least any of vehicle image data, vehicle speed data, vehicle position data, vehicle type data, vehicle brand data, vehicle model data, vehicle color data and vehicle license plate data of the at least one other vehicle in traffic.

6. The vehicle control system according to claim 1, wherein the overtaking support data comprises a determined position and/or a length of the at least one gap.

7. The vehicle control system according to claim 1, wherein the overtaking support data comprises an identification of a vehicle defining the beginning or the end of the at least one gap.

8. A method for providing information to support an overtaking maneuver by a first vehicle, the method comprising:
    receiving image data of at least one other vehicle in traffic from a traffic view camera determining, based on the image data of the at least one other vehicle in traffic, overtaking support data indicative of at least one gap in the traffic suitable for the overtaking maneuver; and
    providing the overtaking support data to the first vehicle for supporting the overtaking maneuver by the first vehicle;
    wherein the traffic view camera is arranged at a second vehicle and configured to obtain image data of at least one vehicle in traffic in the opposite direction to the second vehicle, and
    in accordance with a determination that the second vehicle is in front of the first vehicle travelling in the same direction as the first vehicle, the overtaking support data is indicative of a first gap in the traffic in the opposite direction to the first vehicle ahead of the first vehicle; and
    in accordance with a determination that the second vehicle is in front of the first vehicle travelling in the opposite direction to the first vehicle, the overtaking support data is indicative of a second gap in the traffic in the same direction as the first vehicle ahead of the first vehicle.

9. The method according to claim 8, further comprising:
    obtaining at least any of a time stamp data, a vehicle position data, and a vehicle speed data associated with a second vehicle; and
    determining the overtaking support data indicative of the at least one gap based on any of the time stamp data, the vehicle position data, and the vehicle speed data associated with the second vehicle.

10. The method according to claim 8, further comprising:
    obtaining traffic information data by image processing of the image data of the at least one other vehicle in traffic; and
    providing the traffic information data to the first vehicle.

11. The method according to claim 10, wherein the traffic information data comprises at least any of vehicle image data, vehicle speed data, vehicle position data, vehicle type data, vehicle brand data, vehicle model data, vehicle color data and vehicle license plate data of the at least one other vehicle in traffic.

12. The method according to claim 8, wherein the overtaking support data comprises an identification of a vehicle defining the beginning or the end of the at least one gap.

13. A processing circuitry program product comprising a non-transitory processing circuitry readable medium, having stored thereon a processing circuitry program comprising program instructions, the processing circuitry program being loadable into a processing circuitry and configured to cause execution of the method according to claim 8 when the processing circuitry program is run by the at least one processing circuitry.

\* \* \* \* \*